INVENTORS
NEAL B. COHEN
KURT SOTMAN
BY G. Donald Weber, Jr.
ATTORNEY

Oct. 27, 1964 N. B. COHEN ETAL 3,154,262

SELF-LOCKING, QUICK-RELEASE HUB

Filed April 30, 1962 3 Sheets-Sheet 2

United States Patent Office 3,154,262
Patented Oct. 27, 1964

3,154,262
SELF-LOCKING, QUICK-RELEASE HUB

Neal B. Cohen and Kurt Sotman, Philadelphia, Pa., assignors to Sperry Rand Corporation, New York, N.Y., a corporation of Delaware Filed Apr. 30, 1962, Ser. No. 190,867
6 Claims. (Cl. 242—68.3)

This invention relates to an improved hub. More particularly, the invention relates to an improved hub for mounting a reel thereon. The reel may be such that it is capable of storing magnetic tape or the like thereon.

In the past, tape reels which have been used in the tape handling machines and similar peripheral apparatus which may be used with digital computers, or the like, have generally been mounted on a take-up or supply shaft in one of only a few ways. These methods of mounting are outlined in the copending application entitled "Self Locking, Quick Releasing Hub," Serial Number 84,885, now Patent 3,124,319, by N. B. Cohen and K. Sotman (the inventors of the instant device) and assigned to the assignee of the instant application. The instant invention is provided to facilitate loading and unloading of tape reels used with commercial tape handlers in business machines, as for example digital computers. In addition, the instant invention is utilized to assure proper reel positioning as well as reel position maintenance. This invention which is an improvement over the invention described in the above cited copending application has an advantage in that the number of component parts utilized therein is reduced. Moreover, since the number of parts is reduced the problems of wear are reduced. Furthermore, as will become more readily apparent, the instant invention provides a hub which is relatively unjammable and in the event that jamming occurs unjamming of the hub may be effected.

Briefly, the hub comprises an external housing which encloses all of the internal components therein. The external housing provides a surface for mounting and aligning the reel thereon; a backing plate against which the tape reel abuts; and a mounting plate connected to the other portions of the external housing and which is adapted to be connected to the driving means, for example a motor. The external housing may be so constructed that the above noted portions thereof which have been described primarily in terms of their function, may comprise fewer or more component parts. The internal components of the hub comprise a substantially conical shaped cam having two distinct surfaces with a step or discontinuity therebetween. This cam is spring loaded to prefer one orientation. The cam is connected to a pushbutton on the outside of the external housing whereby another orientation of the cam may be achieved. Adjacent to the cam are gripping elements which are capable of different orientations in accordance with the orientation of the cam. These gripping elements are adapted to grip the inner annulus of the reel to be mounted on the hub when the elements are in one orientation; and to be withdrawn from the inner annulus of the tape reel when the elements (and cam) are in the other orientation. Pivotally mounted means are associated with the holding elements and the cam. The pivotally mounted means are adapted to move the jaw means relative to the cam and the external housing, in accordance with the application of force to the pivotal means by the cam or the reel aforementioned.

Consequently, an object of this invention is to provide an improved hub for reels.

Another object of this invention is to provide a hub which will facilitate the mounting and dismounting of tape reels used in tape handling equipment.

Another object of this invention is to provide a hub which provides positive holding and positive ejecting actions to a reel at different times.

A further object of this invention is to provide a hub which automatically assures proper reel positioning.

A further object of this invention is to provide a hub which allows quick changing of reels.

Another object of this invention is to provide an improved hub having a small number of parts.

Another object of this invention is to provide a hub which is substantially unjammable.

These and other objects and advantages will become more readily apparent when the following description is read in conjunction with the attached drawings in which.

Figure 1:
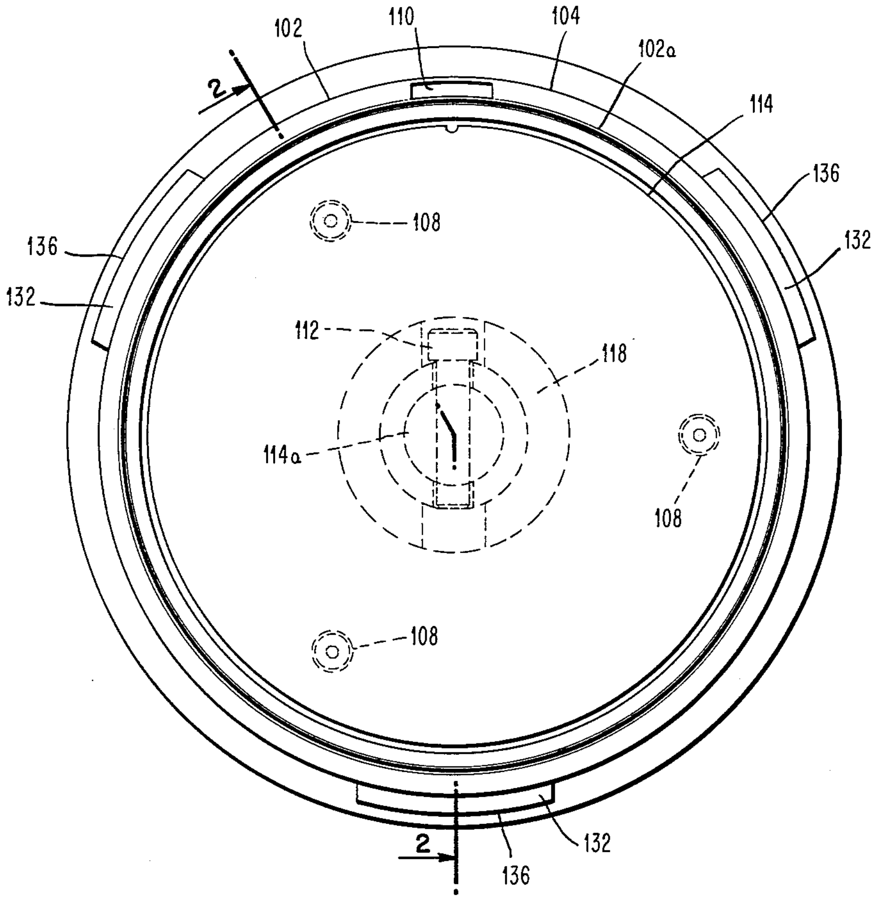
FIGURE 1 is a front view of the hub in the operating condition.

In FIGURE 1, the front view of the hub is shown. Basically, this figure shows a preferred external configuration of the hub. For convenience, certain inner elements are shown in phantom outline. All of the inner elements are not shown in this view, to preserve clarity. A pushbutton 114 mounted at the front of the hub is connected to a two level conical cam 118 by means of bolt 112. That is, stem 114*a* of pushbutton 114 is inserted into an opening at the smaller (front) end of cam 118 and secured by the bolt. Bolts 108 (three shown as a typical example) secure the external housing portions together. These portions include tapered portion 102*a*, back-plate 104 and mounting plate 106 (not shown). Each of these elements is shown in subsequent figures. Lip 136 of holding elements or jaws 132 extends beyond the surface of tapered portion 102 to secure a reel (not shown) to the hub in abutting relation with back-plate 104. A more detailed description of the hub is presented in conjunction with FIGURES 2 through 5.

Figure 2:
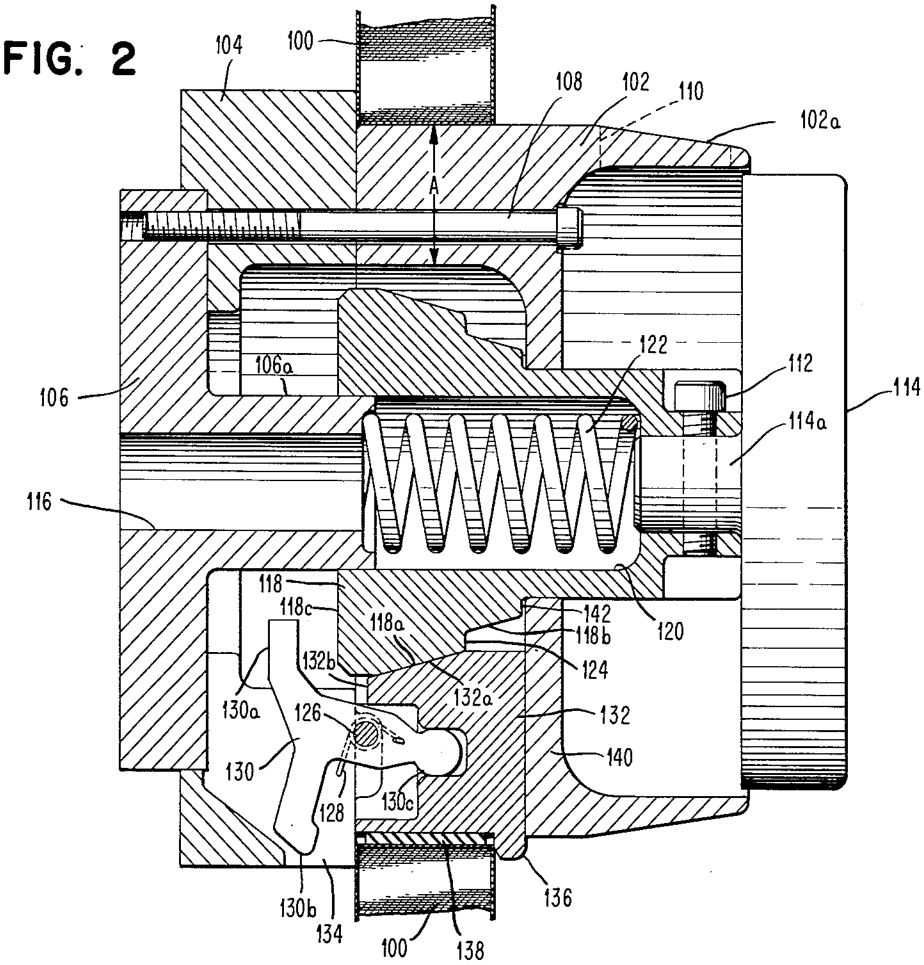
FIGURE 2 is a sectional side view of the hub in the operating condition with the reel mounted thereon.

Referring now to FIGURE 2, there is shown a sectional side view of the hub. FIGURE 2 shows the hub in the operating condition, i.e. the condition wherein the hub has a reel mounted thereon. For purposes of clarity a complete reel is not shown. However, a portion of the inner annulus of the reel is shown. This "reel-section" is designated by reference numeral 100. As described supra, the external housing of the hub comprises the substantially cylindrical section 102 which is utilized for mounting the reel. The back-plate 104 is utilized to provide a surface against which the reel 100 may abut. The mounting-plate 106 is utilized to provide a means for attaching the hub to the driving mechanism, for example the shaft of a motor. The several portions of the external housing are held together by a bolt 108 for example which passes through a hole which may be molded or drilled through the hub sections. These hub portions (as well as others) may be fabricated of cast or molded aluminum, steel, plastic or the like, for example. The substantially cylindrical mounting section 102 may include a tapered portion 102*a* at the front end thereof which is utilized for facilitating the mounting of the reel 100 to the hub. The tapered portion 102*a* is not essential to the operation of the hub but is a preferred design thereof. In addition, a slot or hole 110 may be provided in the tapered end 102*a* of the cylindrical portion 102 whereby access to the bolt 112 may be obtained. Typically, the cylindrical mounting portion 102 may have an axial length of approximately 2¼ inches front to back, that is, from the tip of portion 102*a* to the surface which abuts plate 104. The diameter of the hub at the surface which abuts backplate 104 may be on the order of 3½ inches. This dimension is merely typical and is not limitative of the invention, since the diameter dimension is dictated by the diameter of the inner annulus of the reel to be utilized. The degree of taper and the diameter of the tapered portion 102*a* is, as described supra, a matter of design preference. Typically, the diameter may be on the order of 3¼ inches. The axial thickness of the cylindrical portion 102 (as for example at A) may be on the order of ¾ inch. Once again, this dimension is not meant to be limitative but is merely illustrative of a typical dimension. The thickness of the tapered portion 102*a* is, of course, a function of the degree of taper and the diameter of the pushbutton 114 relative to the diameter of the cylindrical portion 102. Typically, the pushbutton 114 may have an outer diameter of about 2⅞ inches and the thickness of end 102*a* is about ¼ inch. It may be desirable to maintain the thickness of the tapered portion 102*a* as small as possible in order to prevent a large inertial mass when the hub is rotated. The back-plate 104 and mounting-plate 106 are shown as having preferred design configurations. These configurations are not meant to be limitative and may be altered as desired provided sufficient clearance is permitted for ther operation of the hub as decsribed subsequently. Moreover, the back-plate 104 and mounting-plate 106 may comprise a single unitary element and need not be separate components. The mounting-plate 106 incorporates a hole 116 into which a drive shaft (not shown) may be inserted so that the driving means, e.g. a motor (not shown), may be connected to the reel. The diameter of the hole 116 is, of course, defined by the diameter of the shaft to which the hub is to be attached. The depth of the hole 116 is also a design function and may assume any depth including a hole passing completely through the mounting-plate 106, as shown. The raised central portion 106*a* of the mounting-plate 106 has several functions which determine the dimensions of the portion 106*a*. For example since the hub, as shown in FIGURE 2, comprises three elements in the external housing thereof, the portion 106*a* has a length which is basically dictated by the required length of travel of cam 118. That is, raised portion 106*a* must engage cam 118 and should, therefore, extend somewhat into the opening therein. Furthermore, raised portion 106*a* must be sufficiently large to encompass the hole 116 which is required by the shaft of the driving means noted supra. A typical dimension for the raised portion 106*a* would be about ⅞ inch thereby permitting about ⅝ inch travel by cam 118. The peripheral dimensions of this portion are dependent upon the configuration of the portion which may be circular or rectangular or the like (in cross section). That is, the cross-sectional configuration of raised portion 106*a* is determined by the cross-sectional configuration of the hole 120 in cam 118, or vice versa.

The internal components of the hub comprise the aforementioned cam 118. Cam 118 is a substantially conical shaped element which includes the hole 120 previously discussed, which engages or encompasses the raised portion 106*a*. Another opening at the smaller end of the conical cam 118 engages the stem 114*a* of pushbutton 114. A bolt 112 is passed through the sides of the smaller end opening of conical cam 118 which surrounds the stem 114*a* and through the stem 114*a*. Thus, the pushbutton 114 is positively engaged with the cam 118. A helical coil spring 122 is provided in the opening 120 within cam 118. The spring is disposed between the end of raised portion 106*a*, which is inserted within the opening 120, and the end of opening 120 which is adjacent the apex of the conical cam 118. It may be desirable for manufacturing purposes that the opening which engages stem 114*a* is continuous with hole 120, i.e. no inner-surface exists therebetween. For this reason, coil spring 122 (as well as opening 120) should have a diameter larger than the diameter of the opening which receives stem 114*a*.

Cam 118 is clearly shown to have a discontinuous conical surface. That is, the surfaces 118*a* and 118*b* may have tapers of the same degree and should actually be parallel. However, the surfaces 118*a* and 118*b* are not in the same plane but are connected by the ledge or surface 124. A typical taper for the surfaces 118*a* and 118*b* will be about 15° from the center line of the cam. The cam 118, as suggested supra, is normally biased in the forward position by coil spring 122. However, pressure against pushbutton 114 may be effective to provide movement of the cam 118 rearwardly toward mounting-plate 106. This movement may be guided by the raised portion 106*a* as suggested supra. The length of travel of the cam 118 which may be machined of a steel or aluminum material, for example, may be on the order of ¾ inch. Of course, the length of travel of the cam is not limitative of the invention nor is it a basic requirement but rather is typical only. The length of travel is dictated by the degree of taper of cam 118 and the amount of movement required to fully effectuate the operation of jaw 132.

The three armed element 130 is pivotally mounted in the external housing 102. That is, a rod or axial pivot 126 passes through the arm 130*c*, almost centrally thereof, and has its opposite ends inserted in suitable mountings in the element 102. The arm 130*c* includes a preferred configuration for engaging a reel gripping element or jaw 132. Other suitable configurations for arm 130*c* are contemplated. Another arm 130*a* defines an angle of about 120° with arm 130*c*. This angle is not crucial but is determined by other design characteristics of the components described. This arm 130*a* must be such, however, that it extends toward the center of the external housing and is in close proximity to the surface 118*c* of cam 118. Thus, when the cam 118 is moved toward back-plate 106 by pressure on the pushbutton 114, surface 118*c* engages arm 130*a* and interacts to cause rotation of element 130 around pivot 126. As the punched or molded element 130 rotates, arm 130*c* tends to force holding element 132 radially inwardly toward the axis of the hub. Simultaneously, arm 130*b*, which defines an angle about 90°, with arm 130*c* also rotates out of the opening designated 134 to bear against the rear surface of reel 100 thereby pushing said reel off of said mounting surface. A torsion spring 128 is wrapped around the pivot 126. The number of turns of the wrapped portion of the spring are a mere design preference. The opposing ends of the torsion spring are fixed to the inside of the external housing and to the arm 130*c*, respectively. Thus, the spring end which is fixed to the internal portion of the external housing is attached and is not free to rotate. However, the end of the spring which is attached to the arm 130*c* is effectively free to rotate about the pivot 126 such that the torsion spring 128 effectively applies a force to arm 130*c* which force tends to urge arm 130*c* radially inwardly toward the axis of the hub.

The jaw 132 which is engaged by the arm 130*c* is generally of cubic configuration. This configuration is not a full cube inasmuch as the opening for engagement with arm 130*c* is so designed to have a specific configuration at one surface or side of the cube. Furthermore, the surface 132*a* is not parallel to the opposite face but rather is at an angle thereto. This angle is substantially similar to the angle made by the surfaces 118*a* and 118*b* of the cam 118. This similarity of tapers or slopes permits the interaction of the surfaces 118*a* and 118*b* with surface 132*a* such that the surfaces may move relative to one another in a sliding manner. Furthermore, the outer surface of jaw 132 may be considered to have been molded or machined such that a lip or protrusion 136 extends from the surface of the jaw at the forward edge thereof. At the recessed portions of the surface behind lip 136 there is provided a gripping element 138. This element may comprise rubber, cork, or any other similar material. The gripping material is affixed to the surface of the jaw 132 and is adapted to engage the inner surface of the inner annulus of reel 100.

Figure 3:
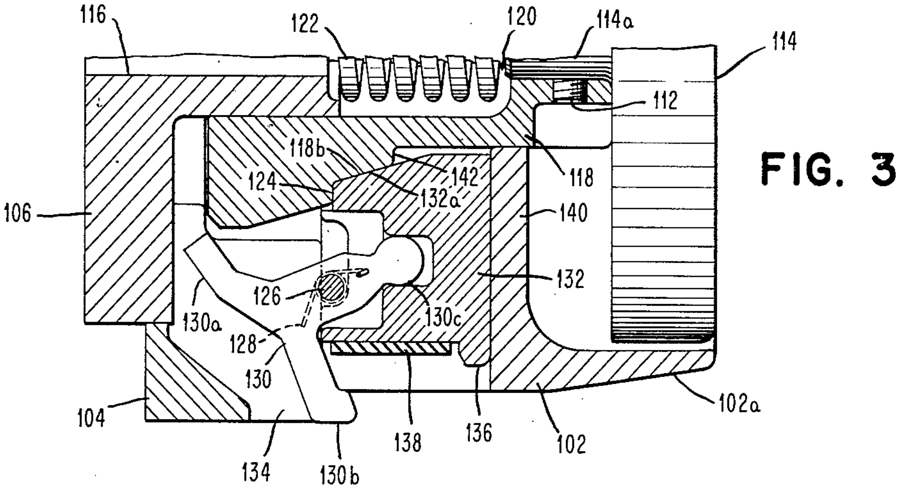
FIGURE 3 is a sectional side view of a portion of the hub shown in FIGURE 2, which portion shows the holding and pivotally mounted members in the locked, non-operating condition.

FIGURE 3 is a cross sectional view of a portion of the hub. This view shows the hub in the non-operating condition, or, in other words, the condition wherein no reel is mounted on the hub. This figure includes components which are similar to those shown in FIGURE 2 but with slightly different orientation. Similar components of FIGURES 2 and 3 bear similar reference numerals. The operation of the hub is best understood by a concurrent description of both FIGURES 2 and 3. Thus, assume that the hub is initially in the operating condition shown in FIGURE 2 and the reel 100 is mounted on the hub. In this condition, the gripping surface 138 is held adjacent to the inner surface of the inner annulus of reel 100 and the lip 136 is located in front of the reel 100. This lip 136 may have a slightly beveled configuration on the inner surface thereof whereby the reel 100 may be effectively urged toward the back plate 104. The jaw 132 which carries the lip 136 and the gripping material 138 is forced outwardly to engagement with the reel 100. The jaw is forced outwardly by the cam surface of cam 118. That is, the cam surface 118*a* slidably engages the surface 132*a* of the jaw. Coil spring 122 forces the cam 118 outwardly along the axis of the hub. Surface 142 could abut against the inner surface of shoulder 140 which is formed by the external housing 102. However, with the application of a reel 100, the surface 142 will reside adjacent to but spaced from shoulder 140. This spacing occurs because of the relative dimensions of the cam 118 at the surface 118*a*, the jaw 132 and the inner diameter of the internal annulus of reel 100. That is, a wedging action is produced upon jaw 132 by surface 118*a* of cam 118 which wedging action would be seriously limited if the surface 142 positively abutted against the inner surface of shoulder 140. That is, the entire force produced by spring 122 would not be transmitted to jaw 132 but a portion would be expended against shoulder 140. Since spring 122 is a large coil spring capable of exerting a pressure of about 10 to 12 pounds, a large force is transmitted to the jaw 132 via the abutting tapered surfaces 118*a* and 132*a*. This large force applied to the jaw 132 is, of course, applied to reel 100 via the resilient gripping surface 138.

FIGURE 3 shows the hub in the non-operating condition with the reel removed. To remove the reel 100 the operator of the machine or instrument utilizing the hub would apply pressure to pushbutton 114. This pressure must be sufficient to overcome the effect of coil spring 122. As the coil 122 is compressed by pressure applied at pushbutton 114, the cam 118 moves axially to the rear portion of the hub. As the cam 118 moves toward backplate 104, slidable movement between cam 118 and jaw 132 is evidenced at the abutting surfaces 118*a* and 132*a*. That is, the surface 118*a* moves rearwardly and the surface 132*a* slides therealong and in so doing permits radial movement of jaw 132 inwardly toward the center of the hub. To insure the fact that the jaw 132 remains in contact with the surface of cam 118 and tends to move into the hub, the torsion spring 128 is provided. This spring, as described supra, has one end thereof fixed within the external housing of the hub. The other end thereof is fixed in arm 130*c* of the pivotally mounted element 130. The torsion spring 128 is so arranged that it is constantly urging, or tending to urge, the jaw 132 inwardly toward the center of the hub. Thus, as the cam 118 moves rearwardly so that the surface 118*a* tends to move away from surface 132*a*, the element 130 is pivotally rotated about pivot 126 due to the urging of spring 128. Since arm 130*c* is engaged with jaw 132, the jaw is urged into the hub by the arm 130*c* which is moved by torsion spring 128. As the cam 118 continues to be urged toward the rear of the hub, the surface 118*a* is urged beyond the surface 132*b* of the jaw 132. Thus, surface 132*a* and surface 118*a* now become disengaged. Since torsion spring 128 is continually urging arm 130*c* to rotate about pivot 126 and, therefore, urging jaw 132 inwardly of the hub, the surface 132*a* comes into engagement with surface 118*b*. As previously described, surface 118*b* has a similar taper or slope to the surface 118*a* and surface 132*a*. At the time when surface 124 is urged beyond surface 132*b*, the jaw 132 moves from surface 118*a* to surface 118*b* in a rapid, forceful manner because the movement is produced in accordance with the urging of element 130 by spring 128. Clearly, the element 130 performs an angular rotation whereby the arm 130*b* extends or protrudes from the opening 134 in the external housing in a rapid forceful manner. Since arm 130*b* is adapted to bear against the back surface of the reel 100 (see FIGURE 1), this forceful action of the arm 130*b* upon the reel 100 is effective to initiate the removal of the reel from the hub. Further urging the cam 118 rearwardly of the hub is effective to bear against the arm 130*a* which may apply further pressure to the reel via arm 130*b* or to the jaw 132 via arm 130*c*. It will be noted, that the hub is now locked in the non-operating condition inasmuch as the surface 124 was urged beyond the surface 132*b*. That is, when the operator releases the pressure upon pushbutton 114, coil spring 122 tends to urge the cam toward the front of the hub. Surface 118*b* slides along surface 132*a* until surface 124 abuts against surface 132*b*. At this stage, the cam 118 cannot move forwardly of the hub inasmuch as the surfaces 124 and 132*b* are locked together. Thus, removal of a hub reel by pressing upon the pushbutton 114 will automatically lock the hub in the non-operating condition. The hub is ready to receive another reel when desired.

Though unlikely, a reel may sometimes become jammed on the hub. This may occur if the reel is slightly larger than usual thereby becoming wedged between back-plate 106 and lip 136 of jaw 132. A more probable cause of jamming, however, is occasioned by dirt accumulation between jaw 132 and housing 102, improper or unusual temperature created expansions, or the like. By applying further pressure at pushbutton 114, a force is applied to arm 130*a* of element 130. This latter force produces an angular rotation of element 130 around pivot 126. Clearly, the rotation of element 130 creates a further inwardly directed force on jaw 132 via arm 130*c*. This force will break the frictional binding of jaw 132, whereupon jaw 132 is retracted such that lip 136 is removed from placement in front of the reel whereby the reel may be removed.

The reverse operation of the hub permits the insertion of a reel and the locking of the reel onto the hub. If a reel is placed on the hub which is in the condition shown in FIGURE 3, the reel is forced toward the rear of the hub into abutment with back-plate 104. In achieving this condition, the element 130 has the arm 130*b* thereof, moved by the rear surface of the reel. This rotational motion of element 130 about pivot 126 causes arm 130*c* to rotate also. As arm 130*c* rotates, a force is applied to the jaw 132 such that the jaw moves radially outwardly from the hub. As the jaw 132 moves, a slidable relative motion occurs between surface 132*b* of the jaw and surface 124 of the cam. As soon as the surfaces 132*b* and 124 are disengaged, the effect of coil spring 122 is to urge cam 118 forwardly in the hub. The subsequent forwardly movement of the cam 118 moves surface 118*a* thereof adjacent to surface 132*a* of jaw 132. When the surfaces 118*a* and 132*a* engage in slidable abutment, the spring 122 is effective to transmit force towards the jaw 132 such that the jaw moves out through the opening associated therewith in the external housing 102. When the jaw 132 moves out of the housing 102, the gripping surface 138 grips the inner annulus of the reel and the lip 136 is located in front of the front surface of the reel. Thus, the reel is positively engaged by the reel gripping elements of the hub as shown in FIGURE 2.

It is to be understood that the precise geometrical configurations shown or suggested for any or all of the components is not meant to be limitative of the invention. That is, the angles, the dimensions, the materials utilized, etc. may have the configuration thereof altered somewhat so long as the interaction and interplay between the associated components is not altered and the principle of the invention is still observed. Thus, these minor variations and modifiications are meant to be included within the concept of this invention. Furthermore, the principles of this invention do not require that a single gripping jaw or element be utilized. On the contrary, a plurality of these elements may be used and, in a preferred embodiment, three such elements may be regularly spaced at approximately 120° intervals around the periphery of the hub. Again, the number of gripping elements is not to be limited to three but rather the number of gripping elements employed may be determined in the individual applications.

Figure 4:
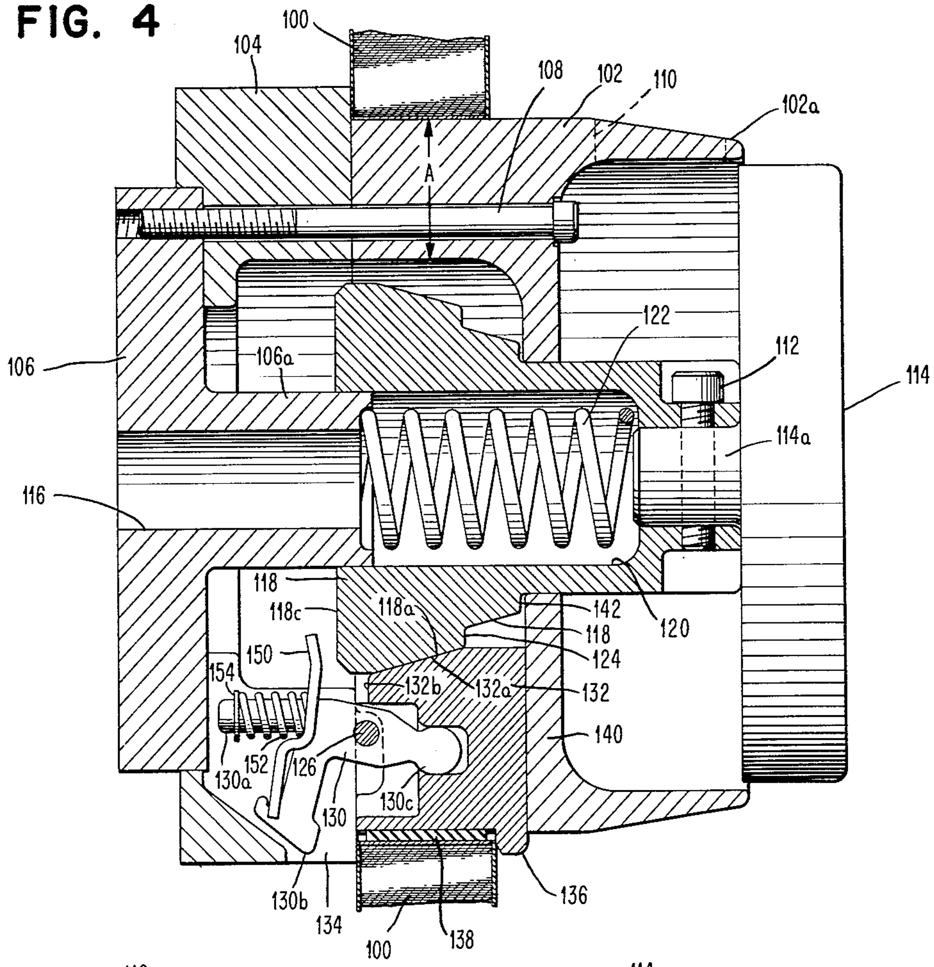
FIGURE 4 is a sectional side view of another embodiment of the invention.

Referring now to FIGURE 4, there is shown a sectional side view of another embodiment of the instant invention. This invention utilizes similar principles as the embodiments of FIGURES 2 and 3 and incorporates a variation in the spring loading arrañgement on the pivotally mounted element 130. The external housing of FIGURE 4 comprising portions 102, 104 and 106 is identical to that shown in FIGURE 3. Moreover, the internal components cam 118, jaw 132, coil spring 122, bolt 112, pushbutton 114 etc. are also similar in the components shown and described in regard to FIGURE 2. The pivot 126 is also substantially similar to that shown in FIGURE 2. The modification incorporated in the second embodiment resides in the configuration of element 130. In particular, the modification relates to the altered geometry of the arm 130*a*. Thus, arms 130*b* and 130*c* define an angle of approximately 90° therebetween. The arm 130*a* instead of defining an angle of approximately 120° with arm 130*c* now defines an angle of approximately 200° therewith. This altered configuration of arm 130*a* is coupled with the addition of the movable portion 150. The element 150 may have an approximately H-shaped configuration. The "crossbar" of the H-shaped element is located such that the top of the crossbar is adjacent to the arm 130*e*. The bottom of the crossbar is adjacent to the recess defined by the lip 130*d* at the end of arm 130*b*. The recess defined by lip 130*d* and the element 150 so interact that the element 150 is free to pivot slightly about the intersection of the two surfaces but is sufficiently snug that a separation of these two elements is unlikely. Moreover, the top of the crossbar of element 150 is so located that element 150 may be moved toward the end of arm 130*a* when the element 150 pivots around the contacting surfaces previously described. A coil spring 152 is wrapped around arm 130*a* and is disposed between element 150 and retaining piece 154. Retaining piece 154 may be any type of pin or washer-like apparatus which is attached to the arm 130*a* and will not move relative thereto. Thus, spring 152 provides a spring load on the movable element 150. It will be seen that spring 152 will permit the desired movement or rotation of element 130 about the pivot 126 when desired but will not continuously exert a torsional moment on the element such that arm 130*c* is continually applying an inwardly directed force against jaw 132 when in the operating condition.

Figure 5:
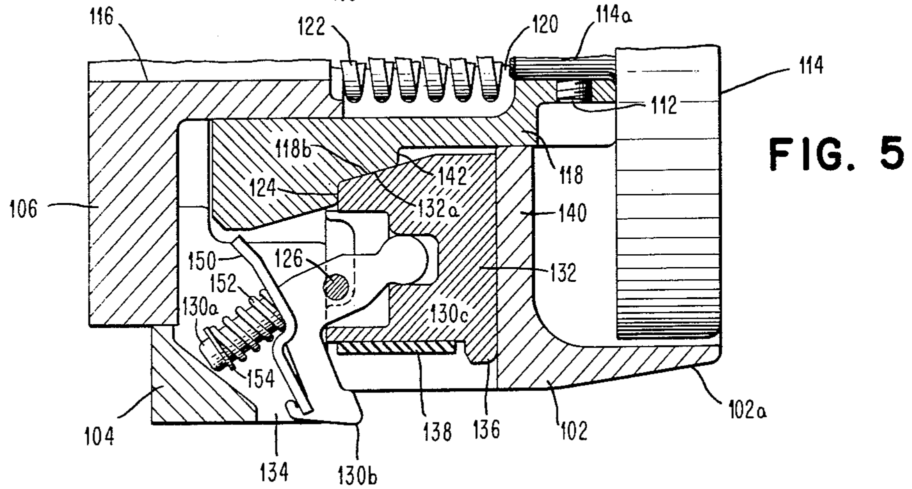
FIGURE 5 is a sectional side view of a portion of the hub embodiment shown in FIGURE 4, which portion shows the holding and pivotally members in the locked, non-operating condition.

FIGURE 5 shows a sectional side view of a portion of the hub shown in FIGURE 4. FIGURE 5 shows this hub when it is in the non-operating condition. Again, by non-operating condition is meant the condition wherein the hub does not have a reel mounted thereon. Elements which are similar to elements shown in FIGURE 4 bear similar reference numerals. The operation of the modified hub embodiment shown in FIGURES 4 and 5 is substantially similar to the operation of the hub described and shown in FIGURES 2 and 3. Thus, when it is desired to remove a reel from the hub, the hub is initially in the condition shown in FIGURE 4, and the hub is finally in the condition shown in FIGURE 5. As in the case of the embodiments shown in FIGURE 2, when force is applied by the operator to pushbutton 114, cam 118 is moved inwardly against the restoration force applied by coil spring 122. When the surface 124 has been urged past surface 132*b*, surface 132*a* is parallel to surface 118*b* and would normally be spaced therefrom. However, the motion of cam 118 produces an engagement between the rear surface 118*c* of cam 118 and the surface of element 150. This engagement is preferably produced prior to the time when surface 124 has passed surface 132*b*. Further movement of cam 118 and, therefore, element 150, causes a compression of spring 152. Thus, the force against element 150 is effectively transferred to the element 130 whereby a rotational moment is created about pivot 126. This moment applies a force directed radically inwardly against jaw 132. Thus, when the surface 124 passes surface 132*b*, the jaw 132 is automatically urged against surface 118*b* in a rapid, forceful step-like motion. When surface 132*a* abuts against surface 118*b* it is clear that the gripping element 138 has been removed from the surface of the inner annulus of the reel 100. Likewise, lip 136 has been removed from the front of the reel 100. Consequently, reel 100 is free to be removed. At the same time, the element 130 has rotated about pivot 126 such that arm 130*b* protrudes from opening 134 and bears against the back surface of the reel 100 with a sharp, forceful impact. This operation tends to push reel 100 away from the back-plate 104 of the hub. Moreover, the relocation of jaw 132 such that surface 132*a* rests against surface 118*b* inherently provides for the abutment of surfaces 124 and 132*b*. The abutment of these surfaces serves to lock cam 118 in the rearward position.

As in the case of the hub embodiment previously described, the infrequent jamming of the hub may be overcome by additional pressure upon pushbutton 114. That is, the cam 118 produces further force on element 130 (via element 150) such that jaw 132 is forceably broken away from the reel or other frictional binding points. When jaw 132 is moved inwardly, the reel may be removed from the hub.

The reverse or opposite operation is possible wherein a reel is placed on a hub which is initially in the condition shown in FIGURE 5 such that the hub assumes the condition shown in FIGURE 4. As in the discussion of the operation of the hub shown in FIGURE 3, the application of a reel to the hub forces arm 130*b* back into the opening 134. This movement of arm 130*b* causes rotation of the element 130 about the pivot 126. The rotation of element 130 tends to apply a radially outward force to the jaw 132 which tends to move the jaw out through the associated opening in the external housing 102. When the jaw 132 is urged out of the opening in the external housing 102, the locking action between surfaces 124 and 118*b* is eliminated. Conseqently, the force applied by spring 122 urges cam 118 forwardly in the hub. As cam 118 moves forward, surface 118*a* comes into contact with surface 132*a* and the force supplied by spring 122 is effectively transmitted to surface 118*a* thereby further urging jaw 132 out of the opening in the external housing 102 into engagement with the inner annulus of reel 100.

Two embodiments of the invention have been described wherein similar principles have been utilized in locking, unlocking and unjamming reel-mounting hubs. Modifications have been provided which are effective to improve the operation and simplify the assembly of the hub. Other modifications may be suggested to those skilled in the art but those modifications which fall within the inventive concepts taught herein are meant to be included within the scope of this invention.

The embodiments of the invention in which an exclusive property or privilege is claimed are defined as follows:

1. In a hub having a cylindrical external housing with apertures therein through which reel gripping elements may protrude, said reel gripping elements having a tapered internal surface, an axially disposed cam having two separate tapered surfaces joined by a step-like riser, the tapered surface of said reel gripping elements having a taper complementary to the taper of said cam, a further surface of said reel gripping elements adapted to selectively bear against said step-like riser of said cam to lock said cam and said reel gripping elements in a first position, means engaged with said reel gripping elements for selectively moving said elements such that said further surface thereof is removed and said cam is free to assume a second position, and spring loaded means for normally urging said cam toward said second position whereby said reel gripping elements are urged toward a second position.

2. In combination, a substantially hollow cylindrical member, means attached to one end of said cylindrical member to provide a closure therefor, a substantially conically shaped member disposed internally of said cylindrical member but spaced from said first named means, said first named means including a portion thereof which engages said conically shaped member and provides a guide therefor, said conically shaped member having two parallel tapered surfaces separated by a step-like surface which intersects each of said tapered surfaces at the same angle, reel retaining means movably mounted at the periphery of said cylindrical member, said reel retaining means having a tapered internal surface adjacent and complementary to said conically shaped member, means adapted to maintain said internal surface of said reel retaining means in contact with one of the tapered surfaces of said conically shaped surface, and means adapted to move said conically shaped member relative to said cylindrical member and said reel retaining means whereby said reel retaining means alternatively bears against different ones of said two tapered surfaces.

3. A hub comprising, a cylindrical external housing having a plurality of apertures therein, said housing including at least a cavity therein, a cam element axially mounted in said cavity and adapted for axial movement relative to said housing, said cam element adapted to assume at least two different axial positions relative to said housing, means for urging said cam element to normally assume one of said different positions, a plurality of gripping elements each of which is mounted at one of said apertures in said external housing and adapted for radial movement relative to said housing, said gripping elements being adapted to assume different positions in accordance with the position assumed by said cam element, said cam element having a discontinuous step-like surface comprising at least two parallel surface portions joined by a substantially vertical riser portion, each surface portion of which alternatively bears upon a first complementary surface of said gripping element to control the position thereof, said gripping element having a second surface adapted to abut against the riser portion of said step-like surface of said cam element to lock said elements together, and means for releasing said locked together elements, said releasing means being engaged with said gripping element and adapted to move said element away from said cam element.

4. In combination, a substantially hollow cylindrical member, said cylindrical member having one end thereof tapered to receive a reel, means attached to another end of said cylindrical member to provide a closure therefor, a cam member disposed internally of said cylindrical member, said cam member formed of two different size frustoconical portions and thereby having two parallel tapered surfaces separated by a step-like surface, jaw means mounted adjacent to the periphery of said cylindrical member and adapted to extend through holes in said periphery, said jaw means having a tapered internal surface adjacent to and complementary to the surfaces of said said cam member, means adapted to maintain said internal surface of said jaw means in contact with the tapered surfaces of said cam member, and means adapted to move said cam member relative to said cylindrical member and said jaw means whereby said jaw means bears against one of said two parallel tapered surfaces, said jaw means including a surface which abuts against said step-like surface of said cam member only when said jaw means bears against a predetermined one of said two tapered surfaces of said cam member.

5. A reel mounting hub comprising, an external housing having a substantially hollow cylindrical configuration and at least one aperture in the periphery thereof, a base member attached to one end of said external housing, a substantially centrallly located portion of said base member extending into said external housing, a cam member mounted within said external housing and adapted for axial movement relative thereto, said cam member composed of two frustoconical portions having different diameters which portions are joined together such that the frustoconical surfaces are parallel and separated by a substantially normal ledge surface, said cam member including an opening at the larger end thereof for engaging said substantially centrally located portion of said base member, a coil spring disposed in said opening in said cam member in abutment with said centrally located portion of said base member such that a force is exerted on said cam member, means attached to the smaller end of said cam member such that force may be applied thereto in opposition to the force applied by said coil spring, detent means disposed at each aperture in the periphery of said external housing and capable of radial movement relative to said housing, said detent means including a first surface having a taper which is complementary to the parallel surfaces of said cam member and which bears upon said surfaces alternatively, said detent means including a second surface which is parallel to said ledge surface of said cam member and adapted to selectively bear upon said ledge surface after force has been applied to said cam member by said means attached to said smaller end thereof, and at least one lever means pivotally mounted in said external housing adjacent said apertures therein, said lever means including first, second and third joined together portions thereof, said first portion of said lever means being engaged with said detent means and adapted to move or be moved thereby, said second portion of said lever means disposed adjacent said apertures in said housing and adapted to selectively extend from said apertures, said third portion of said lever means disposed adjacent said cam member and adapted to be moved thereby.

6. A reel mounting hub comprising, an external housing having a substantially hollow cylindrical configuration and a plurality of apertures in the periphery thereof, a base member attached to one end of said external housing and having a substantially centrally located portion thereof extending into said external housing, an actuator member mounted within said external housing and adapted for axial movement relative thereto, said actuator member composed of two frustoconical portions having different diameters which portions are joined together such that the frustoconical surfaces are parallel and separated by a ledge surface which is substantially normal to said frustoconical surfaces, said actuator member including an opening at the larger end thereof for engaging said substantially centrally located portion of said base member, a coil spring disposed in said opening in said actuator member and in abutment with said centrally located portion of said base member, said coil spring producing a force on said actuator member such that said actuator member assumes a first position relative to said housing, means attached to the smaller end of said actuator member such that force may be applied thereto in opposition to the force applied by said coil spring such that said actuator member assumes a second position relative to said housing, separate detent means disposed at each aperture in the periphery of said external housing and capable of radial movement relative to said housing, said detent means including a first surface having a taper which is complementary to the parallel surfaces of said actuator member and which bears upon said surfaces alternatively when said actuator member is in different positions, said detent means including a second surface which is parallel to said ledge surface of said actuator member and adapted to selectively bear upon said ledge surface, and separate lever means pivotally mounted in said external housing adjacent each of said apertures, each of said lever means including first, second and third arms, said first arm of said lever means being engaged with said detent means and adapted to move or be moved thereby, said second arm of said lever means disposed adjacent said apertures in said housing and adapted to selectively extend from said apertures, said third arm of said lever means disposed adjacent said actuator member and adapted to be moved thereby when said actuator member assumes said second position in response to the application of force at the means attached to the smaller end of said actuator member.

References Cited in the file of this patent

UNITED STATES PATENTS

| | | |
|---|---|---|
| 2,213,379 | Bird et al. | Sept. 3, 1940 |
| 2,733,873 | Petersen | Feb. 7, 1956 |
| 2,890,055 | Garrison | June 9, 1959 |
| 2,923,489 | Bunch | Feb. 2, 1960 |